United States Patent
Felix et al.

(10) Patent No.: US 7,557,164 B2
(45) Date of Patent: Jul. 7, 2009

(54) MEMBRANES OF FLUORINATED IONOMER BLENDED WITH NONIONOMERIC FLUOROPOLYMERS FOR ELECTROCHEMICAL CELLS

(75) Inventors: Vinci Martinez Felix, Kennett Square, PA (US); Gonzalo Escobedo, Bear, DE (US); Ram-Tirth Khanna, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 123 days.

(21) Appl. No.: 10/920,486

(22) Filed: Aug. 18, 2004

(65) Prior Publication Data

US 2005/0043487 A1 Feb. 24, 2005

Related U.S. Application Data

(60) Provisional application No. 60/496,210, filed on Aug. 19, 2003.

(51) Int. Cl.
*C25B 9/10* (2006.01)
*C08L 27/12* (2006.01)
*B01D 29/46* (2006.01)
*C25B 13/00* (2006.01)

(52) U.S. Cl. .............. 525/199; 525/200; 526/242; 526/243; 526/249; 210/490; 210/640; 210/650; 204/252; 204/296

(58) Field of Classification Search ............... 525/199, 525/200; 210/490, 640, 650; 204/252, 296
See application file for complete search history.

(56) References Cited

U.S. PATENT DOCUMENTS

| | | | |
|---|---|---|---|
| 3,282,875 A | 11/1966 | Connolly et al. | |
| 3,635,926 A | 1/1972 | Gresham et al. | |
| 4,035,565 A * | 7/1977 | Apotheker et al. | 526/249 |
| 4,358,545 A | 11/1982 | Ezzell et al. | |
| 4,433,082 A | 2/1984 | Grot | |
| 4,528,058 A | 7/1985 | Asawa et al. | |
| 4,743,658 A | 5/1988 | Imbalzano et al. | |
| 4,940,525 A | 7/1990 | Ezzell et al. | |
| 5,066,682 A | 11/1991 | Miyazaki et al. | |
| 5,281,680 A | 1/1994 | Grot | |
| 5,703,185 A | 12/1997 | Blair | |
| 5,773,480 A | 6/1998 | Stone et al. | |
| 6,110,333 A * | 8/2000 | Spethmann et al. | 204/252 |
| 6,179,132 B1 * | 1/2001 | Moya | 210/490 |
| 6,252,000 B1 * | 6/2001 | O'Brien | 525/199 |
| 6,277,512 B1 | 8/2001 | Hamrock et al. | |
| 6,359,019 B1 | 3/2002 | Stone et al. | |
| 6,495,209 B1 | 12/2002 | Cisar | |
| 6,896,777 B2 * | 5/2005 | Arcella et al. | 204/296 |
| 6,902,676 B2 * | 6/2005 | Arcella et al. | 210/640 |
| 2005/0077233 A1 * | 4/2005 | Hedhli et al. | 210/500.27 |

FOREIGN PATENT DOCUMENTS

| | | |
|---|---|---|
| EP | 0 345 964 A1 | 12/1989 |
| EP | 1 126 537 A1 | 8/2001 |
| EP | 1 238 999 A1 | 9/2002 |
| EP | 1 323 744 A1 | 7/2003 |

OTHER PUBLICATIONS

Polymer Handbook, 3$^{rd}$ Ed, J. Brandrup et al, p. V39, V46, V52, V55.*
"Polymer Handbook" 3$^{rd}$, Ed., by J Brandrupt et al.*
Jung-Chou Lin et al, "Study of Blend Membranes Consisting of NAFION and Vinylidene Fluoride-Hexafluoropropylene Copolymer", Journal of Applied Polymer Science, vol. 70, pp. 121-127, (1998), John Wiley & Sons, Inc., New York, NY.

* cited by examiner

*Primary Examiner*—Duane Smith
*Assistant Examiner*—Ives Wu

(57) ABSTRACT

Blends of fluorinated ionomer with at least two nonionomeric fluoropolymers provide fuel cell membranes whose tensile strength and conductivity are superior to blends using a single fluoropolymer.

12 Claims, No Drawings

MEMBRANES OF FLUORINATED IONOMER BLENDED WITH NONIONOMERIC FLUOROPOLYMERS FOR ELECTROCHEMICAL CELLS

FIELD OF THE INVENTION

This invention is in the field of ion exchange membranes for fuel cell applications.

BACKGROUND OF THE INVENTION

Fluorinated ionomers are widely used in electrochemical cells such as fuel cells and chloralkali cells, as well as in fluid drying and humidification. In physical form they may be films or tubing. The forms are fabricated by melt extrusion or by extrusion or casting of solutions of the ionomers or precursors thereof. In the case of melt extrusion, melt-processible precursors of the ionomers are used because the ionomers themselves are difficult to melt-process. For solution processing, solutions of ionomer precursor can be made in fluorocarbon solvents, or the ionomers themselves may be put into solution, for example by the process disclosed in U.S. Pat. No. 4,433,082, to Grot.

Melt extrusion is limited in how thin the film can be made. One reason for this is that the glass transition temperature (Tg) of most ionomer precursor polymers is near room temperature or below. Films of less than 1-2 mils (25-50 μm) in thickness have a Saran-like clinging property and require use of interleaving during film windup. The thin film attracts contamination and stretches, that is, lacks dimensional stability.

A further drawback of thin extruded films is that they are difficult to hydrolyze. Hydrolysis is necessary to convert the ionomer precursor polymer to the ionomeric form. This generally requires caustic, water, and often solvent, and heating. The polymer swells when hydrolyzed and thin films are difficult to handle in this condition without risk of dissolution or tearing.

Because of these problems, ionomer films are generally not extruded at less than 1 mil (25 μm) thickness. Continuous hydrolysis of a 1 mil film on a commercial scale is not economical and such films are typically laminated to other films or substrates before hydrolysis. If extruded films are to be hydrolyzed without further fabrication, they must be at least 2 mils (50 μm) and more usually 3 mils (75 μm) thick.

Binary blends of fluoropolymers with fluorinated ionomer to give compositions that can be made into a fluorinated ionomer membrane that has increased strength by virtue of the presence of the fluoropolymer are disclosed in European Patent No. 345964. These blends are used in electrolysis of brine to make caustic and chlorine, i.e. in chloralkali applications. Chloride ion rejection by the membrane is improved by the blending, but membrane ohmic resistance is increased as shown by the increase in voltage of the electrolytic cell. U.S. Pat. No. 6,495,209 discloses blends of fluoropolymer with fluorinated ionomer for improving physical properties of fuel cell membranes. Blends of fluorinated ionomer with THV (tetrafluoroethylene/hexafluoropropylene/vinylidene fluoride) copolymer are disclosed in U.S. Pat. No. 6,277,512.

Further improvements in fluorinated ionomer membrane conductivity and tensile strength are needed to meet the increasing demands that advancing fuel cell technology places on them.

SUMMARY OF THE INVENTION

The invention provides a membrane comprising (a) about 70 to about 95 wt % fluorinated ionomer in the acid or salt form or the precursor thereof and (b) about 30 to about 5 wt % of two melt-processible fluoropolymers that are substantially free of ion-exchange groups, and that differ from each other in melting point by at least about 5° C.

The invention also provides an electrochemical cell comprising (a) about 70 to about 95 wt % fluorinated ionomer in the acid or salt form or the precursor thereof and (b) about 30 to about 5 wt % of two melt-processible fluoropolymers that are substantially free of ion-exchange groups, and that differ from each other in melting point by at least about 5° C.

DETAILED DESCRIPTION

Fluorinated ionomers used in accordance with this invention are ion exchange polymers with cation exchange groups in the acid (proton) or salt form, hereinafter referred to as acid groups. Such acid groups include sulfonic acid groups, carboxylic acid groups, phosphonic acid groups, and boronic acid groups. Preferably, the ionomer has sulfonic acid and/or carboxylic acid groups. For fuel cells the ionomer preferably has sulfonic acid groups.

Furthermore, the fluorinated ionomers are melt processible, at least in their ionomer precursor form. They are fluorinated, preferably highly fluorinated ion-exchange polymers having acid groups. "Fluorinated" means that at least about 10% of the total number of univalent atoms in the polymer are fluorine atoms. "Highly fluorinated" means that at least about 90% of the total number of univalent atoms in the polymer are fluorine atoms. Most preferably, the polymer is perfluorinated.

By melt processible is meant that the polymer can be processed with conventional plastics processing equipment such as extruders and injection molding machines. Such melt processible polymers have melt flow rates (MFR) as measured by ASTM D-1238 in the range of about 1 to 100 g/10 min, preferably about 1 to 50; more preferably about 2 to 30.

Preferably, the fluorinated ionomer comprises a polymer backbone with recurring side chains attached to the backbone, the side chains carrying acid groups. Possible fluorinated ionomers include homopolymers and copolymers that are functionalized with acid groups by grafting. Preferred are copolymers formed from at least one monomer that is a nonfunctional monomer and that provides carbon atoms that are incorporated in the polymer backbone. A second monomer provides both carbon atoms for the polymer backbone and also contributes the side chain carrying the acid group or its precursor, e.g., a sulfonyl halide group such as sulfonyl fluoride ($—SO_2F$), which can be subsequently hydrolyzed and converted to a sulfonic acid group. For example, copolymers of a first fluorinated vinyl monomer together with a second fluorinated vinyl monomer having a sulfonyl fluoride group ($—SO_2F$) can be used. Possible first monomers include tetrafluoroethylene (TFE), hexafluoropropylene (HFP), vinyl fluoride (VF), vinylidine fluoride ($VF_2$), trifluoroethylene, chlorotrifluoroethylene, perfluoro(alkyl vinyl ether), hexafluoroisobutylene (($CH_2$=$C(CF_3)_2$), ethylene, and mixtures thereof. TFE is preferred. Possible second monomers include fluorinated vinyl ethers with sulfonic acid groups or precursor groups which can provide the desired side chain in the polymer. Additional monomers can also be incorporated into these polymers if desired.

Other sulfonic acid fluorinated ionomers are known and have been proposed for fuel cell applications. Polymers of trifluorostyrene bearing sulfonic acid groups on the aromatic rings are an example (U.S. Pat. No. 5,773,480). The trifluorostyrene monomer may be grafted to a base polymer to make the ion-exchange polymer (U.S. Pat. No. 6,359,019).

A class of preferred fluorinated ionomers for use in the present invention includes a highly fluorinated, most preferably perfluorinated, carbon backbone and a side chain represented by the formula —(O—$CF_2CFR_f$)$_a$—O—$CF_2CFR'_fSO_3X$, wherein $R_f$ and $R'_f$ are independently selected from F, Cl or a perfluorinated alkyl group having 1 to 10 carbon atoms, a=0, 1 or 2, and X=H, a metal cation, preferably an alkali metal cation, or an ammonium ion derived from ammonia or amines. The preferred polymers include, for example, polymers disclosed in U.S. Pat. No. 3,282,875 and in U.S. Pat. Nos. 4,358,545 and 4,940,525. One preferred ionomer comprises a perfluorocarbon backbone and the side chain is represented by the formula —O—$CF_2CF(CF_3)$—O—$CF_2CF_2SO_3H$. Ionomers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro(3,6-dioxa-4-methyl-7-octenesulfonyl fluoride) (PDMOF). If the polymer is to be melt fabricated, this is done with the polymer in the sulfonyl fluoride form, which is more melt processable than the hydrolyzed form. When in final physical form, the sulfonyl fluoride groups of the polymer are hydrolyzed to sulfonate groups and ion exchanging if needed to convert to the desired form. Another preferred fluorinated ionomer of the type disclosed in U.S. Pat. Nos. 4,358,545 and 4,940,525 has the side chain —O—$CF_2CF_2SO_3H$. This ionomer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed, after any necessary melt processing, by hydrolysis and ion exchange. Ion exchange is needed because sulfonyl fluoride is usually hydrolyzed in alkaline solution and a sulfonic acid salt results, such as potassium sulfonate. Because proton exchange membrane fuel cells use membranes with acid groups, the sulfonate is ion-exchanged with acid to convert it to sulfonic acid if the membrane is to be used in fuel cells.

The membranes in accordance with the invention preferably are about 0.2 to about 200 μm thick, more preferably about 0.5 to about 150 μm thick, most preferably about 1 to about 100 μm thick.

Fluorinated ionomers used in membranes are ordinarily characterized by their equivalent weight, which is the weight of polymer in the hydrogen-ion or acid form in grams that will neutralize one equivalent of base. Preferably, the fluorinated ionomer employed in the practice of the present invention comprises two fluorinated ionomers of different equivalent weights.

For the TFE/PDMOF copolymers described above, equivalent weights are in the range of 700 to 1500, preferably about 800-1350, more preferably about 850 to 1200, most preferably about 900 to 1100. Because equivalent weight is influenced by the molecular weight of the vinyl ether, an alternative way has been developed for characterizing ionomer ion exchange capacity independently of the molecular weight. This is the ion-exchange ratio (IXR). IXR is the number of carbon atoms in the polymer backbone divided by the number of ion-exchange groups. For the TFE/PDMOF copolymers, described above, IXR is related to equivalent weight (EW) by the equation: (EW=50×IXR+344). The IXRs corresponding to the EW ranges given above are about 8 to 24, preferably about 10 to 21, more preferably about 12 to 18. The IXR applies regardless of how the ion-exchange group is attached to the polymer backbone. For the TFE/POPF copolymers, described above, IXR is related to equivalent weight (EW) by the equation: (EW=50×IXR+308).

Fluorinated ionomers may contain more than one type of acid group, but a single type of acid group is preferred. Membranes may be made up of more than one ionomer such as by blends of ionomers as in the preferred form of the invention disclosed in the examples, or multilayer constructions, such as by lamination or coextrusion of different ionomers. Sulfonic acid fluorinated ionomer membranes have been membranes of choice in fuel cells because of the facility with which these membranes transport protons, i.e. sulfonic acid fluorinated ionomer membranes have high proton conductivity.

By "fluoropolymers that are substantially free of ion-exchange groups" is meant fluoropolymers made without intentional addition, either through grafting or by incorporation in an appropriate monomer, of functional groups capable of ion-exchange. A small number of ion-exchange groups may be incorporated by the polymerization initiator or through the presence of "unstable endgroups" such as acid fluoride end groups which hydrolyze to produce carboxylate groups. Unstable endgroups are characteristic of fluoropolymerization, as disclosed in U.S. Pat. No. 4,743,658. Such incidental groups may have some ion-exchange capability, normally present at a concentration of no more than about 1000 per million carbon atoms in the polymer, and usually less than about 500. Fluoropolymers which have been post-fluorinated to decrease unstable end groups, i.e., fluorinated after polymerization, can be used if desired to improve the durability of the membrane. Fluorinated polymers typically have very low levels of unstable endgroups, e.g., less than 6 per million carbon atoms in the polymer. For convenience, fluoropolymers that are substantially free of ion-exchange groups may sometimes be referred to herein as "nonionomeric fluoropolymers".

The fluoropolymers that are substantially free of ion-exchange groups preferably have at least about 10% of the total number of univalent atoms in the polymer as fluorine atoms. More preferably, they are "highly fluorinated", having at least about 90% of the total number of univalent atoms in the polymer as fluorine atoms. The fluoropolymers preferably are perfluorinated.

The fluoropolymers useful for blending with the fluorinated ionomer include the melt-processable copolymers of tetrafluoroethylene (TFE) with one or more of hexafluoropropylene (HFP); fluoro(alkyl vinyl ether) (FVE) where the alkyl group can have from one to ten carbon atoms, may also include ether oxygens, may be partially or completely fluorinated, preferably perfluorinated, in which case the FVE is designated PAVE (perfluoro(alkyl vinyl ether)), and may be linear, branched, or cyclic; perfluoroalkyl ethylenes ($R_f$—CH=$CH_2$); and hydrocarbon olefins such as ethylene (E) and propylene. Also of utility are homopolymers of vinylidene fluoride (PVDF), and copolymers of vinylidene fluoride ($VF_2$) with HFP, TFE, hexafluoroisobutylene (HFIB), and polymers of vinyl fluoride (VF). The term "copolymer" is used in this application to describe polymers made by polymerizing two or more monomers.

Preferred copolymers are TFE/HFP (FEP), TFE/PAVE (PFA), and TFE/HFP/PAVE. Preferred alkyl groups in PAVE are perfluorinated and are propyl, ethyl, and methyl, propyl and ethyl being more preferred. A number of PAVEs with different alkyl groups may be used in the copolymer. Preferred copolymers are perfluorinated.

The nonionomeric fluoropolymers may be crystalline or amorphous. By amorphous it is meant that the heat of fusion calculated from any endotherm detected in a differential scanning calorimetry (DSC) scan for as-polymerized resin is no more than about 3 J/g, preferably no more than about 1 J/g. Such endotherms, if actually present, are diffuse, difficult to detect, and calculated heat of fusion at these levels is subject to large relative error. Generally, no endotherm is seen in a second DSC heating even if a weak endotherm is detected for first heating. Preferably, the nonionomeric fluoropolymers are crystalline.

The melting points of the two nonionomeric fluoropolymers differ by at least about 5° C., preferably by at least about 10° C., more preferably by at least about 15° C., more preferably still by at least about 20° C., still more preferably by at least about 25° C. and most preferably by at least about 30° C.

The melting point of the first nonionomeric fluoropolymer preferably is within about 10° C. of the melting point of the fluorinated ionomer, more preferably within about 5° C. The melting point of the second nonionomeric fluoropolymer preferably is at least about 15° C. higher than the melting point of the fluorinated ionomer, more preferably at least about 20° C. higher, still more preferably at least about 25° C. higher, and most preferably at least about 30° C. higher.

The nonionomeric fluoropolymers may be made from the same monomers if they meet the melting point requirements described above. It is preferable, however, that the fluoropolymers be of different monomer compositions. For example, one nonionomeric fluoropolymer can be FEP and the other PFA. Though PFA is a generic name for copolymers of TFE with PPVE, PEVE, and PMVE (sometimes TFE/PMVE copolymers are described as "PMA" and these may contain in addition to PMVE, some PPVE), PFA polymers made with different perfluoro(alkyl vinyl ethers) are considered as fluoropolymers of different monomer compositions for the purposes of this invention.

The melt flow rate (MFR) (according to ASTM D 1238) of the fluorinated ionomer and each of the fluoropolymers should be within about 40 MFR units of one another, preferably within about 30 MFR units, more preferably about 20 MFR units. The MFR unit is g/10 min. If more than one fluorinated ionomer is used in the blend and they have different MFR, then the MFR of the fluorinated ionomers after blending is the basis for comparison with the MFRs of the fluoropolymers.

The membranes of this invention contain about 70 to 95 wt % fluorinated ionomer, preferably about 80 to 90 wt %, more preferably about 82 to 88 wt %, the balance being two non-ionomeric fluoropolymers.

The ratio of the first nonionomeric fluoropolymer to the second nonionomeric fluoropolymer is about 9:1 to 1:9, preferably about 4:1 to 1:4, more preferably about 3:1 to 1:3, and most preferably about 2:1 to 1:2.

Melt-blending of the fluorinated ionomer with the fluoropolymers may be done on equipment known to those skilled in the art, such as roll mills, kneaders, and extruders, preferably kneaders and extruders, more preferably extruders, most preferably twin-screw extruders. It is preferred that the two non-ionomeric fluoropolymers be blended together first in a high shear mixing device, such as a twin screw extruder, preferably at high temperature and short contact time. This permits thorough mixing of the nonionomeric polymers in the absence of the ionomer, and therefore without the risk of thermal or shear degradation of the ionomer, whose integrity is critical to membrane conductivity and therefore to fuel cell performance. Modest thermal and shear effects on the non-ionomeric fluoropolymers are acceptable because these properties of the polymers do not significantly affect membrane conductivity.

The well-mixed blend may then be pelletized and the pellets fed with ionomer, which is preferably pelletized also, to a single-screw low shear extruder for extrusion to a die suitable for making film. Alternatively, the pelletization step may be omitted if the twin-screw extruder is coupled to a single screw extruder fitted with the appropriate die. The extruded membrane is a minimum of about 0.2 μm thick, preferably about 0.5 μm thick, more preferably about 1 μm thick, still more preferably about 10 μm thick, most preferably about 25 μm thick. The extruded membrane is a maximum of about 200 μm think, preferably about 150 μm thick, more preferably about 100 μm thick, most preferably about 50 μm thick.

After extrusion, the membrane can be hydrolyzed and acid exchanged using procedures which are known for use in hydrolyzing perfluorosulfonic acid membranes in the sulfonyl fluoride form such as:

1. Treating the membrane in a solution with composition: 16 wt % KOH and 20 wt % dimethyl sulfoxide (DMSO) at 80° C. for 45 minutes;
2. Water rinse at room temperature to eliminate excess KOH and washout DMSO;
3. Treating the hydrolyzed membrane in 20% aqueous $HNO_3$ for 30 minutes at room temperature; and
4. Rinsing the membrane with deionized water to eliminate excess $HNO_3$.

The membranes of this invention are useful where ion-exchange membranes are traditionally used. In accordance the invention, the membranes are employed in electrochemical cells such as electrolytic cells, fuel cells and storage cells, i.e. batteries. An important example of electrolytic cells are chloralkali cells, used in the production of caustic and chlorine by the electrolysis of brine. Because of the growing importance of fuel cells based on hydrogen and hydrocarbon fuels, especially methanol, where thin, highly conductive membranes with good mechanical properties are desired, membranes of this invention are especially useful for fuel cell applications.

EXAMPLES

Polymers:

FEP—A copolymer TFE/HFP/PEVE approximately 87/12/1 wt % and melt flow rate 22 is made according to the general method of U.S. Pat. No. 5,703,185, Example 1. The FEP is fluorinated after polymerization to reduce unstable end groups. Its melting point is about 265° C.

PFA—TFE and PAVE (PEVE) are copolymerized in water according to the general procedure of U.S. Pat. No. 3,635,926. The FEP is fluorinated after polymerization to reduce unstable end groups to less than about 6 unstable end groups per million carbon atoms. PAVE content is about 7 wt %, melting point is about 295° C., and melt flow rate is about 16.

Fluoroionomers—N-1000 and N-920 are copolymers of TFE and PDMOF. They are made according to the general method disclosed in U.S. Pat. No. 5,281,680. The equivalent weights are 1000 and 920 respectively. The melt flow rates of the polymer in sulfonyl fluoride form are 20 to 24 g/10 min, respectively.

Test Methods:

Melt flow rates are determined according to the method of ASTM D 1238.

Tensile strength is determined according to the method of ASTM D-882.

Membrane thickness is measured to the nearest 0.1 mil (2.5 μm) using an Ames type gage with a ½" (13 mm) diameter foot under a pressure of 2.5 psi (17 kPa). Extruded films (unhydrolyzed) can be measured without conditioning. Hydrolyzed acid or salt form membranes are measured wet.

Fuel Cell—The fuel cell used is made by Fuel Cell Technologies (Albuquerque, N.Mex.): Its area is 25 cm$^2$ cell with Pocco graphite flow fields. The cell is assembled and then conditioned for 10 hours at 80° C. and 25 psig (170 kPa) back pressure with 100% relative humidity hydrogen and air being fed to the anode and cathode, respectively. The gas flow rate is two times stoichiometry, that is, hydrogen and oxygen are fed to the cell at twice the rate of theoretical consumption at the cell operating conditions. During the conditioning process the cell is cycled between a set potential of 200 mV for 10 minutes and the open circuit voltage for 0.5 minutes, for a period of 3 hours. Then, the cell is kept at 400 mA/cm$^2$ for 1 hour. Next, two polarization curves are taken, starting with the current density at 1200 mA/cm$^2$ and then stepping down in 200 mA/cm$^2$ decrements to 100 mA/cm$^2$, recording the steady state voltage at each step. After conditioning, the cell is tested at 65° C. and atmospheric pressure with 100% relative humidity hydrogen and oxygen. Hydrogen is supplied to the anode at a flow rate equal to 1.25 stoichiometry. Filtered compressed air is supplied to the cathode at a flow rate to supply oxygen at 1.67 times stoichiometry. Two polarization curves are taken, starting with the current density at 1000 mA/cm$^2$, and then stepping down in 200 mA/cm$^2$ decrements to 100 mA/cm$^2$, recording the steady state voltage at each step. Voltage at 800 mA/cm$^2$ reported in the Tables below is the average of values read from the polarization curves.

Through-plane Conductivity Measurement—The membrane is placed between two planar electrodes and its AC impedance is determined. A ¼" (6 mm) diameter disk of the membrane is punched out and sandwiched between two electrodes. The electrodes are made by coating Toray carbon paper with ~2.4 mg/cm$^2$ of a 57:43 Nafion®:carbon black mixture. Alternatively, gas diffusion electrodes commercially available from Etek (DeNora North America, Somerset N.J., USA) can be used. The stack, with added water, is then assembled in a cell fixture. The cell electrodes are ½" (13 mm) diameter and are attached to a ¼" (6 mm) diameter stainless rods with polished faces which have been gold plated. These are assembled in a vise which is tightened by a torque wrench to give a relatively high pressure of some 8.3 MPa (1200 psi). This high pressure forces intimate contact of the coated paper with the membrane. The method utilizes impedance spectroscopy to measure the ohmic (real) and capacitive (imaginary) components of the membrane impedance. The membrane is boiled in deionized water for one hour before testing. The plot of imaginary vs. real impedance (impedance plot or Nyquist plot) is used. The linear portion of the plot is extrapolated to zero capacitance, where the ohmic resistance is measured. From this value, and the membrane thickness (measured wet), the conductivity in S/cm is obtained. The real part of the impedance is typically measured at 100 kHz. The area resistance of the membrane is determined by subtracting the fixture short value.

Example 1

This example demonstrates the performance of fluorinated ionomer blends with FEP and PFA wherein the fluorinated ionomer makes up 90 wt % of the blend, and the ratio of FEP to PFA. 45 parts each of N-1000 and N-920 are melt-blended with 10 parts FEP or 10 parts PFA, or 5 parts each of FEP and PFA. In the last case, the FEP and PFA are first melt-blended to produce a visually homogeneous 1:1 wt:wt blend, which is pelletized. The membrane is 0.8 mil (20 μm) thick. Table 1 summarizes the results. FEP has a beneficial effect on conductivity and tensile strength, PFA has a beneficial effect on voltage. The blend of FEP and PFA has good conductivity with acceptable voltage and good tensile strength.

TABLE 1

| N1000 parts | N920 parts | FEP parts | PFA parts | Conductivity (mS/cm) | Voltage at 800 mA/cm$^2$ | Tensile Strength (kPSI) |
|---|---|---|---|---|---|---|
| 0.45 | 0.45 | 0.10 | 0.00 | 67.660 | 0.567 | 3.888 |
| 0.45 | 0.45 | 0.05 | 0.05 | 66.797 | 0.570 | 3.410 |
| 0.45 | 0.45 | 0.00 | 0.10 | 65.240 | 0.575 | 2.955 |

Example 2

This example is like Example 1 except that 41.3 parts of N1000 and 38.7 parts N920 are blended with 20 parts of FEP, PFA, or blends thereof. Table 2 summarizes the results.

TABLE 2

| N1000 parts | N920 parts | FEP parts | PFA parts | Conductivity (mS/cm) | Voltage at 800 mA/cm$^2$ | Tensile Strength (kPSI) |
|---|---|---|---|---|---|---|
| 0.413 | 0.387 | 0.20 | 0.00 | 58.907 | 0.530 | 3.565 |
| 0.413 | 0.387 | 0.15 | 0.05 | 60.311 | 0.532 | 3.250 |
| 0.413 | 0.387 | 0.11 | 0.09 | 60.922 | 0.534 | 3.014 |
| 0.413 | 0.387 | 0.05 | 0.15 | 61.003 | 0.538 | 2.691 |
| 0.413 | 0.387 | 0.00 | 0.20 | 60.302 | 0.542 | 2.439 |

The Examples show the superiority of blends of fluorinated ionomer with at least two fluoropolymers that are substantially free of ion-exchange groups and that differ in melting point by at least about 5° C. over blends of fluorinated ionomer with a single fluoropolymer. The surprising synergistic effect of combined fluoropolymers provides membranes with a desirable balance of physical properties and electrochemical performance.

What is claimed is:

1. A melt extruded membrane consisting essentially of a melt blended mixture of (a) about 70 to about 95 wt % fluorinated ionomer in acid or salt form or precursor thereof and (b) about 30 to about 5 wt % of two melt-processible crystalline fluoropolymers that are substantially free of ion-exchange groups, and that differ from each other in melting point by at least about 5° C., wherein the first of said two other fluoropolymers that are substantially free of ion-exchange groups has a melting point within about 10° C. of the melting point of the fluorinated ionomer, and the second of said two other fluoropolymers that are substantially free of ion-exchange groups has a melting point at least about 15° C. higher than the melting point of the fluorinated ionomer.

2. The membrane of claim 1 wherein the fluorinated ionomer comprises about 80-90 weight % of the total composition.

3. The membrane of claim 1 wherein the fluorinated ionomer comprises two fluorinated ionomers of different equivalent weights.

4. The membrane of claim 1 wherein the fluorinated ionomer is perfluorinated ionomer.

5. The membrane of claim 1 wherein at least one of said two fluoropolymers that are substantially free of ion-exchange groups is a perfluoropolymer.

6. The membrane of claim 1 wherein said first fluoropolymer is present in amount equal to or greater than said second fluoropolymer.

7. The membrane of claim 1 having a thickness of about 0.2 to about 200 micrometers.

8. The membrane of claim 1 wherein said ionomer has sulfonic acid groups.

9. An electrochemical cell comprising the membrane of claim 1.

10. The electrochemical cell of claim 9 wherein said electrochemical cell is a fuel cell.

11. The membrane of claim 1 wherein at least one of said two fluoropolymers that are substantially free of ion-exchange groups is a copolymer selected from the group consisting TFE/HFP, TFE/PAVE, and TFE/HFP/PAVE.

12. The membrane of claim 1 wherein the second of said two other fluoropolymers that are substantially free of ion-exchange groups has a melting point at least about 3000 higher than the melting point of the fluorinated ionomer.

* * * * *